July 12, 1966  J. W. OEHRLI  3,260,287
CHAIN SAW WITH SAW CHAIN SHARPENER
Filed May 17, 1962  4 Sheets-Sheet 1
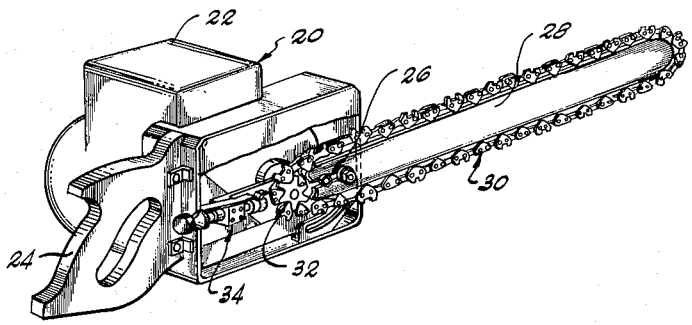
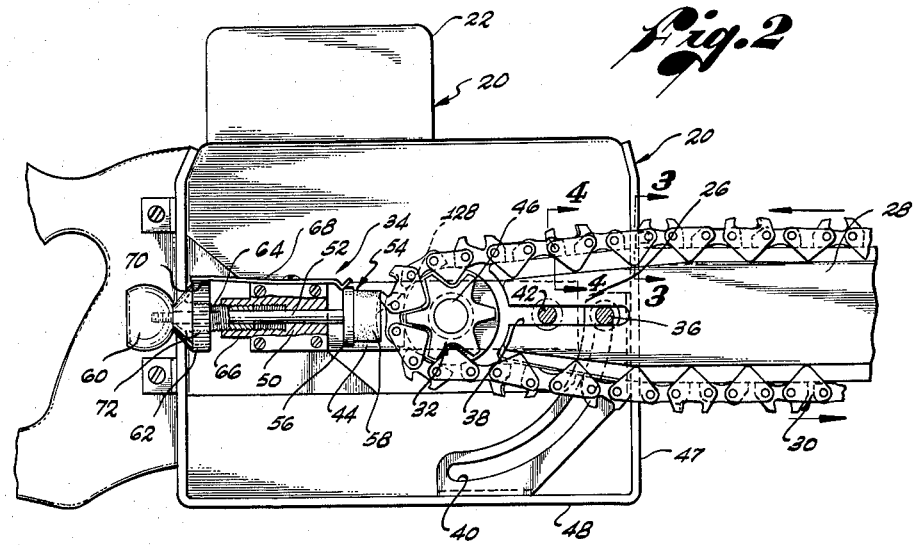
INVENTOR.
JOHN W. OEHRLI
BY Forrest J. Lilly
ATTORNEY

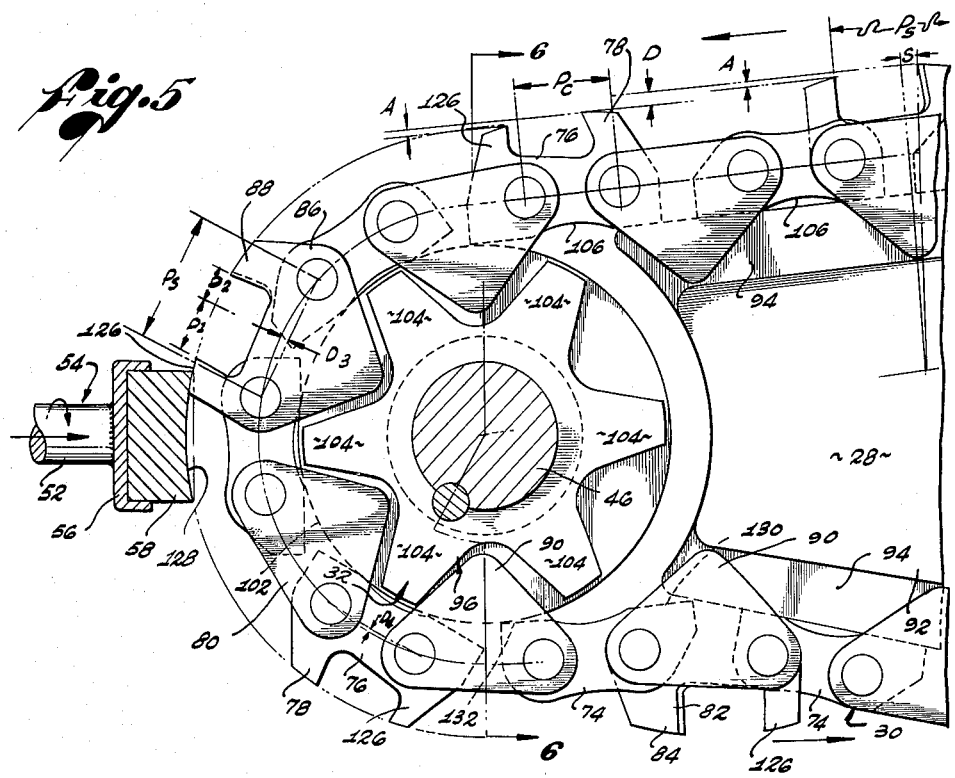
Fig. 5
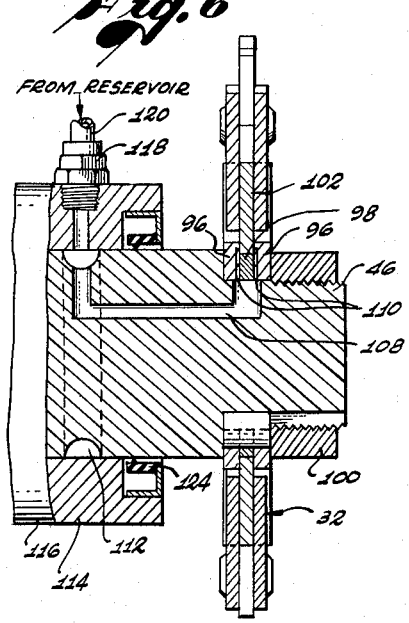
Fig. 6
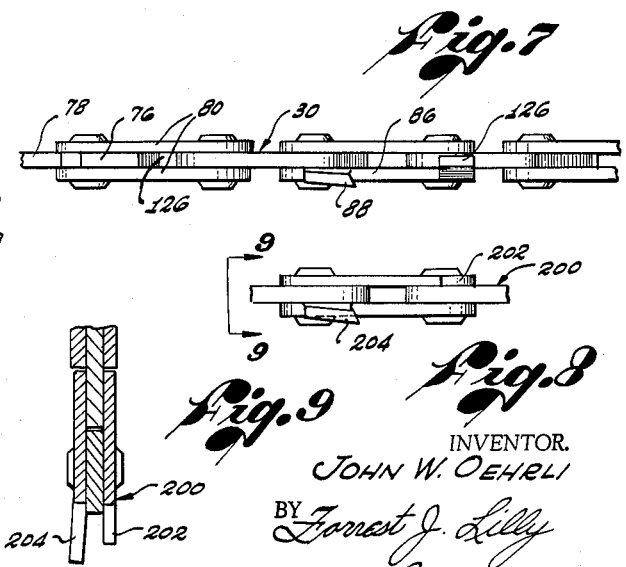
Fig. 7
Fig. 8
Fig. 9
INVENTOR.
JOHN W. OEHRLI
BY Forrest J. Lilly
ATTORNEY July 12, 1966    J. W. OEHRLI    3,260,287
CHAIN SAW WITH SAW CHAIN SHARPENER
Filed May 17, 1962    4 Sheets-Sheet 3
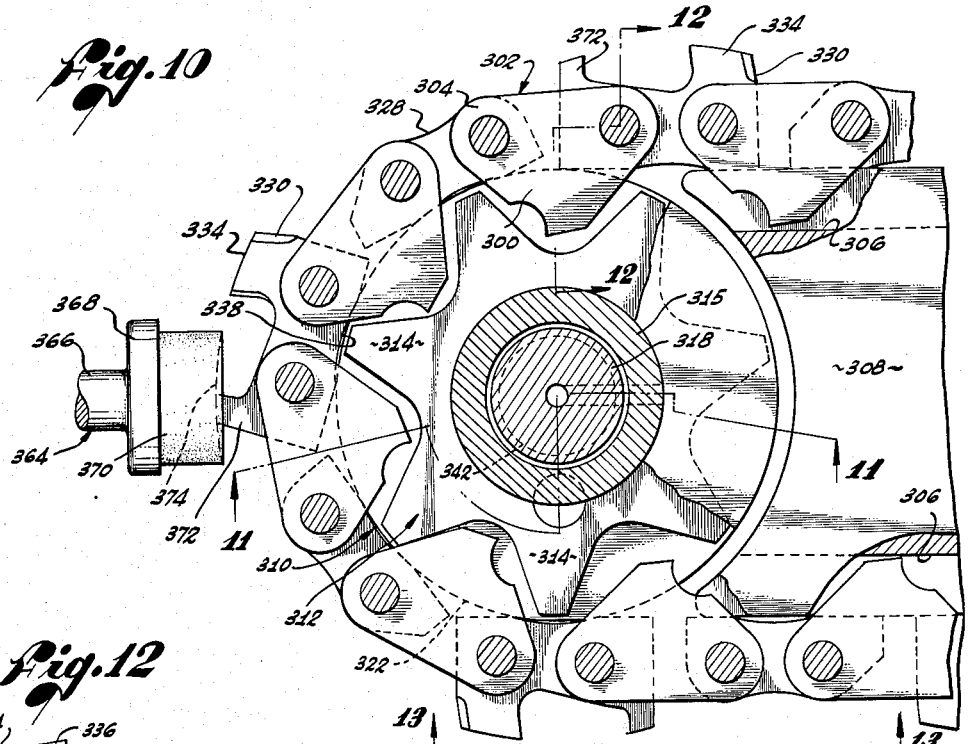
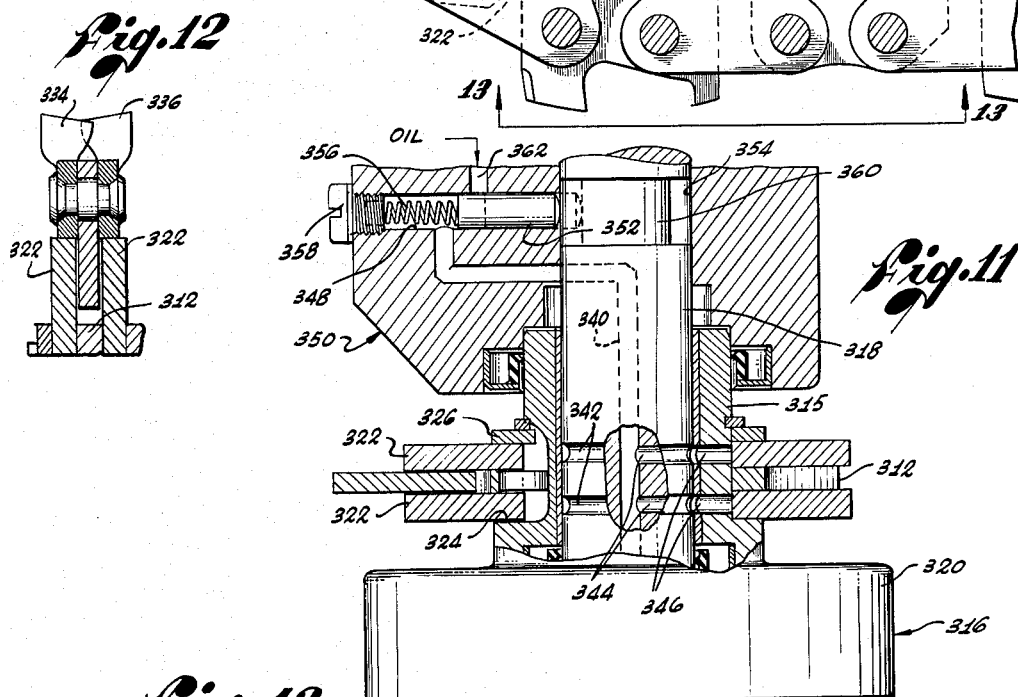
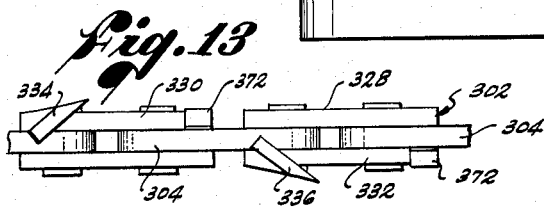
INVENTOR.
JOHN W. OEHRLI
BY Forrest J. Lilly
ATTORNEY

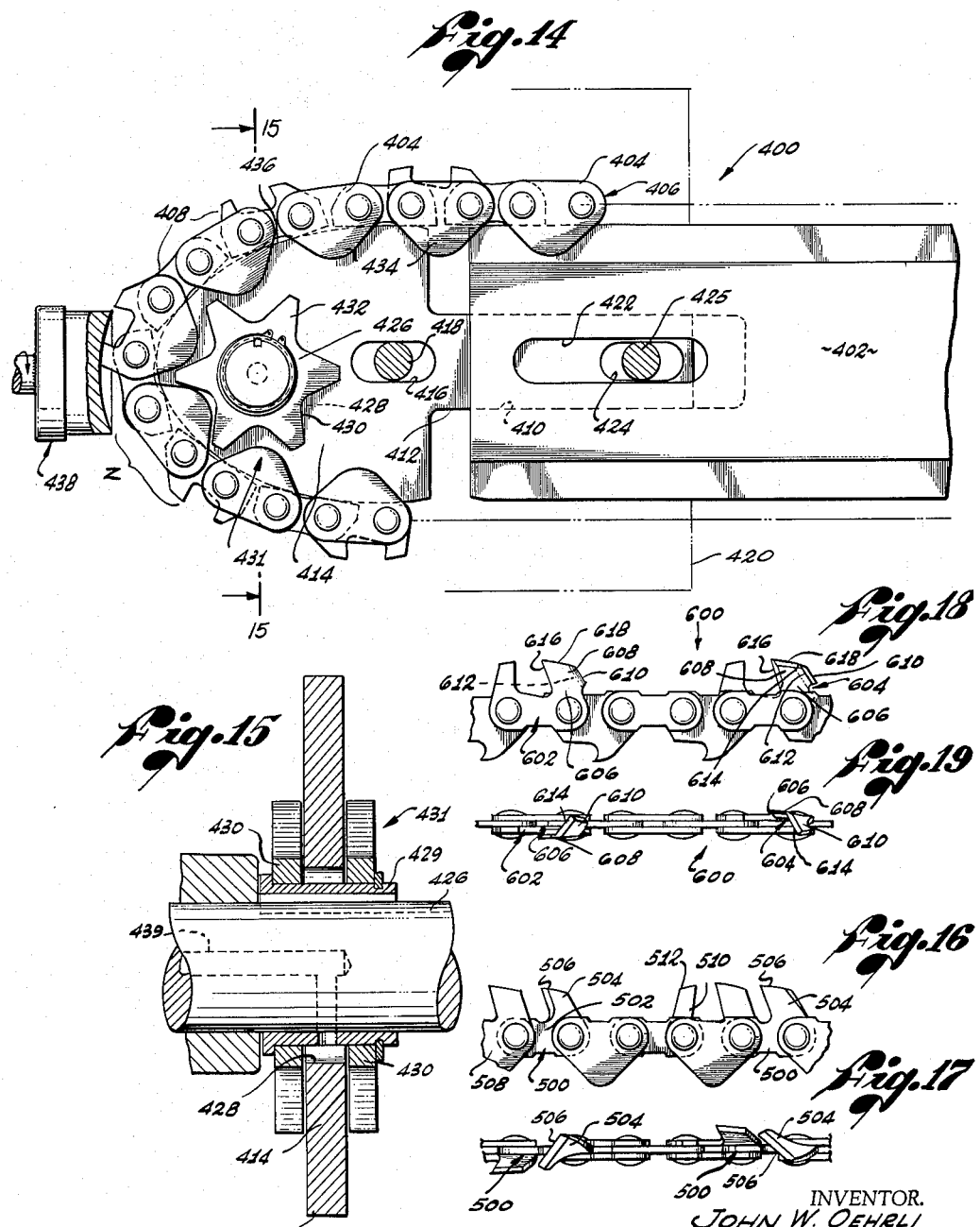

United States Patent Office 3,260,287
Patented July 12, 1966

3,260,287
CHAIN SAW WITH SAW CHAIN SHARPENER
John W. Oehrli, Pacific Palisades, Calif., assignor, by mesne assignments, to Textron, Inc., Providence, R.I., a corporation of Rhode Island
Filed May 17, 1962, Ser. No. 195,519
13 Claims. (Cl. 143—32)

This invention relates generally to chain saws and, particularly, to an improved chain saw and saw chain sharpener combination.

It is well recognized by users of chain saws that the cutting teeth of the saw chain must be sharpened periodically to maintain their optimum cutting efficiency. The actual operation of sharpening the teeth, however, is difficult and tedious if done by hand because of the precision with which each tooth must be sharpened, the shape of most chain saw teeth which renders proper sharpening thereof a difficult task even for the most skilled chain saw user, and the large number of teeth, of generally different types, which are contained on the average saw chain.

To overcome these difficulties of hand sharpening, chain saws with rotary, power driven saw chain sharpeners have been devised. Such power driven, chain-saw-mounted sharpeners permit even relatively unskilled users to sharpen a saw chain with much greater ease, speed, and precision than was possible with chain saws requiring hand sharpening. Unfortunately, however, the existing chain saws which are equipped with saw chain sharpeners are deficient in various respects, some of which will be dealth with as the description proceeds.

A general object of the present invention is to provide an improved chain saw and saw chain sharpener combination which avoids many, if not all, of the deficiencies inherent in most existing chain saw and saw chain sharpener combinations, whereby the present chain saw is completely practical, suitable for both amateur and professional use, and otherwise optimally adapted to its intended functions and purposes.

Another object of the present invention is to provide a chain saw of the character described which utilizes a rotary hone, rather than a conventional grinding wheel, and in which the rotary hone is oriented to turn on an axis parallel to the saw bar, and thereby present a transverse honing surface for contact with the saw teeth, whereby the honing surface is continuously dressed, by the saw teeth themselves, to a cup shape such that each tooth contacts the honing surface throughout a substantial distance of travel of each tooth past the hone.

In order to enable precise and uniform grinding of the chain saw teeth, the saw chain must be supported in such a way that each saw chain link mounting a cutting tooth is firmly stabilized against endwise and lateral rocking, or other undesirable motions, during movement of its respective tooth past the hone or sharpener. Such stability is not obtained, for example, in chain saws wherein the saw chain links are supported on the ends of sprocket teeth as they travel past the sharpener. This type of support permits the links to rocks in the endwise direction when they contact the sharpener, thereby causing the cutting teeth to catch or grab on the grinding wheel, for example.

It is, accordingly, another object of the present invention to provide a chain saw of the character described embodying a unique sprocket for supporting the saw chain as the latter travels past the sharpener, which sprocket provides the required stability for the toothed links of the chain as these links move past the sharpener.

The sharpener of the present chain saw is designed for use with many, if not a majority, of the conventional saw chains which can be sharpened by grinding their top surfaces and including, for example, those with the long existing scratcher teeth. Some saw chains, however, contain depth gauges preceding the actual cutting teeth which have a different height than and serve to limit the depth of cut of their respective trailing teeth. Other saw chains contain saw teeth whose cutting edges are disposed at different heights and arranged in a particular sequence, such as one wherein there are side cutting teeth which cut grooves along the sides of the saw kerf and raker teeth, slightly lower than the side cutters, which "chip" out the rib between the grooves cut by the side cutters. This type of cutting action is desirable since it reduces the power requirements of the saw. In other cases, the side cutters and rakers may be disposed at the same height.

This invention provides an improved saw chain containing depth gauges and cutting teeth and/or different types of cutting teeth which must be sharpened to different heights, the pitch of which chain varies from link to link, and the cutting teeth and depth gauges, if any, of which are arranged in such a way that the teeth and depth gauges are accurately and automatically sharpened to the correct heights.

The invention will now be described in greater detail by reference to the attached drawings, wherein:

FIG. 1 is a perspective view of a chain saw constructed in accordance with my invention;

FIG. 2 is a side elevation, on enlarged scale, of the chain saw in FIG. 1, with a portion of the handle and saw bar of the chain saw broken away;

FIG. 3 is an enlarged section taken along line 3—3 in FIG. 2;

FIG. 4 is an enlarged section taken along line 4—4 in FIG. 2;

FIG. 5 is an enlarged detail, in side elevation, of a portion of the chain saw illustrated in FIG. 1, showing, especially, my present improved saw chain sharpener, one form of my improved saw chain, and one form of my improved saw chain drive sprocket;

FIG. 6 is a section taken along line 6—6 in FIG. 5;

FIG. 7 is a top plan view of some of the links in the saw chain of FIG. 5;

FIG. 8 is a top plan view of an alternative link configuration for the saw chain in FIG. 5;

FIG. 9 is an enlarged section taken along line 9—9 in FIG. 8;

FIG. 10 is a view, similar to FIG. 5, showing an alternative saw chain and saw chain drive sprocket of the invention.

FIG. 11 is a section taken along line 11—11 in FIG. 10;

FIG. 12 is a section taken along line 12—12 in FIG. 10;

FIG. 13 is a top plan view of some of the links embodied in the saw chain of FIG. 10;

FIG. 14 illustrates a further modified chain saw of the invention having a saw chain, saw bar, and drive sprocket which are preassembled for attachment to and removal from the saw frame as a single integral unit;

FIG. 15 is an enlarged section taken along line 15—15 in FIG. 14;

FIG. 16 illustrates a saw chain tooth configuration for use on a present chain saw;

FIG. 17 is a top plan view of the saw chain in FIG. 16;

FIG. 18 illustrates a twisted tooth saw chain according to the invention; and

FIG. 19 is a top plan view of the saw chain in FIG. 18.

In FIG. 1 of these drawings, the present chain saw will be seen to comprise a frame 20 including a housing 22 which encloses a small internal combustion engine (not shown) or other suitable prime mover for the chain saw. Attached to the rear of the frame 20 is a handle 24 by which the chain saw may be held. Also attached to the frame 20, by means 26, and projecting forwardly of the frame is a saw bar 28.

Trained about the saw bar is a saw chain 30 which is uniquely constructed in accordance with this invention and will be described later. Chain 30 is of the type which straddles the saw bar 28. At the rear end of the saw bar, chain 30 passes around and is driven by an improved sprocket drive 32 of the invention. Sprocket drive 32, then, serves to drive the saw chain 30 around the saw bar 28.

Mounted on the saw frame 20, to the rear of the sprocket drive 32, is the improved saw chain sharpener 34 of this invention.

Referring now to FIG. 2, the means 26 for securing the saw bar 28 to the saw frame 20 will be seen to comprise a bolt 36 which passes through a longitudinal slot 38 in the rear end of the saw bar and through a curved slot 40 in the saw frame 20. Also passing through the saw bar slot 38 is a bolt 42. This bolt serves to connect the saw bar to a supporting plate 44 of the present improved saw chain sharpener 34. Plate 44 is rotatably supported on the shaft 46 of the chain saw engine (not shown). Slot 40 is centered on the axis of the shaft 46.

From this description, it is evident that if the bolt 36 is losened, the saw bar 28 and the sharpener supporting plate 44 may be rotated about the shaft 46 as a center. The saw bar 28 may thereby be positioned as shown in FIG. 1, or in a position at right angles to that shown in FIG. 1, or at some intermediate position. The saw bar may then be locked in its adjusted angular position by tightening the bolt 36.

Frame 20 has right angularly disposed guides 47 and 48 engageable with a workpiece. Thus, the saw may be used for felling trees or for cutting finished lumber, for example. In this latter use, the saw is advantageous since it can be used to make a flat-ended cut through a flat workpiece.

In FIG. 2, the present sharpener 34 will be seen to comprise a bearing 50 which is rigidly attached to the supporting plate 44. Slidably and rotatably journaled in this bearing is the shaft 52 of the saw chain sharpener 54 proper. Rigidly fixed to the right-hand end of the shaft 52 is a disc 56. A cylindrical honing stone 58 is bonded to the disc 56.

Fixed to the left-hand end of the sharpener shaft 52 is a knob 60. A stop nut 62 is rotatably mounted on the shaft 52 between the knob 60 and the bearing 50. Stop nut 62 has an externally threaded stem 64 which is threaded in an internally threaded sleeve 66 rigid on the bearing 50.

It is evident that the stop nut 62 limits right-hand movent of the sharpener 54 with respect to its bearing 50. The right-hand limit of movement of the sharpener may be adjusted by rotating the stop nut to thread it into or out of the sleeve 66. Fixed to the bearing 50 is a spring leaf 68. The left-hand end of this spring leaf carries a detent 70 enageable in serrations 72 formed about the periphery of the stop nut 62. Spring leaf 68, therefore, serves to releasably restrain the stop nut 62 against rotation and thereby to releasably lock the stop nut in adjusted axial position. The length of the detent 70 and the leaf spring 68 is made such as to be engagable with the serrations in the stop nut in every axial position of adjustment thereof.

As will be described shortly, sharpener 54 is designed to hone the outer surfaces of the cutting teeth on the saw chain 30 as these teeth move around the sprocket 32 and past the sharpener. To accomplish this honing action, the knob 60 of the sharpener is gripped to move the sharpener to the right in FIG. 2. The sharpener is simultaneously rotated by turning knob 60.

Reference is now made to FIGS. 5 and 6 which illustrate the saw chain 30, sprocket 32, and sharpener 54 in enlarged detail. In FIG. 5, the saw chain 30 will be observed to be made up of center links 74 without cutting teeth, center links 76 with raker teeth 78, outside links 80 without cutting teeth, outside links 82 with right-hand side cutters 84, and, finally, side links 86 with left-hand side cutters 88. These several links of the saw chain are pivotally connected in the usual manner with the following cutter sequence: center raker, right side cutter, center raker, left side cutter, center raker, and so on.

The outside links 80, 82 and 86 of the saw chain have generally triangularly shaped root portions 90. These root portions will be observed to be arranged in pairs spaced transversely of the saw chain.

Saw bar 28 comprises a relatively thick central portion 92 and edge portions of reduced thickness defining guide ribs or tracks 94 which extend along the top edge, around the right-hand end, and then back along the bottom edge of the saw bar. These guide ribs are straddled by the pairs of root portions 90 on the saw chain, the spacing between the root portions of each pair being proportioned to receive the saw bar rib 94 with a relatively close sliding fit.

The drive sprocket 32 in the chain saw under consideration comprises two identical sprocket elements 96 which are keyed to the engine shaft 46, as may be best observed in FIG. 6. The two sprocket elements are maintained in spaced relationship by means of a washer 98 between the elements. A nut 100 threaded on the shaft 46 clamps the two sprocket elements 96 and the spacing washer 98 tightly together and firmly to the shaft.

Between the sprocket elements 96 is a saw chain supporting plate or disc 102. The thickness of this disc is slightly less than the spacing between the sprocket elements 96 and the disc is rotatably supported on the washer 98. Accordingly, the saw chain supporting disc 102 can turn freely with respect to the sprocket 32.

Returning again to FIG. 5, the saw chain supporting disc 102 will be observed to have a slightly larger outside diameter than the teeth 104 of the sprocket elements 96. These sprocket elements are keyed on the shaft 46 in such a way that their teeth 104 are aligned. During travel of the saw chain 30 around the sprocket 32, the root portions 90 of the saw chain engage in the spaces between the sprocket teeth 104 and are drivably engaged by the sprocket teeth, in the manner hereinafter described, to drive the saw chain 30 about the saw bar 28. Moreover, as the saw chain 30 passes around the sprocket 32, the center links 74, 76 of the chain seat against the outer peripheral edge of the sprocket disc 102 so that the latter supports the saw chain, in the radial direction of the sprocket, as it travels around the sprocket. Each center link of the saw chain will be seen to have a central recess 106 in the edge thereof which engages the sprocket disc 102. The curvature of this recess, while it may have the same radius as the disc 102, preferably has a somewhat smaller radius than the disc in order to afford each center link of the saw chain with two point contact with the sprocket disc. Each center link of the saw chain is thereby stabilized against end wise rocking movement while engaging the disc. The root portions 90 of the outer saw chain links straddle the sprocket disc 102, between the sprocket teeth 104, to stabilize the links of the saw chain against lateral rocking movement.

From the description thus far, it is evident that when the sprocket 32 is driven in rotation, the sprocket teeth 104 drivably engage the root portions 90 of the saw chain links to drive the saw chain as described earlier. It is evident from FIG. 5 that the sprocket disc 102 retains the saw chain 30 at a greater radial distance from the axis of rotation of the sprocket than the pitches of the saw chain and sprocket would normally dictate.

If we assume that the sprocket 32 is driven in the counterclockwise direction of rotation indicated by the arrow in FIG. 5, the root portions 90 of the saw chain links enter the spaces between the sprocket teeth 104 at the top of the sprocket in FIG. 5 and leave the spaces at the bottom of the sprocket. Now it is evident that as each pair of root portions moves from its generally linear path of motion on the saw bar to its circular path of motion about the sprocket, they undergo or have a component of relative motion radially inward toward the axis of the sprocket with respect to the adjacent sprocket teeth. In the coventional chain drive sprocket arrangement, this relative inward motion of the root portions on the chain occurs simultaneously with driving contact between the sprocket teeth and the root portions of the chain links. Accordingly, there is substantial sliding friction between the sprocket teeth and root portions which creates wear of the sprocket teeth and root portions as well as friction losses which must be overcome by the chain saw engine.

According to the present invention, where the saw chain is maintained a greater radial distance from the axis of the sprocket, by the sprocket disc 102, than the saw chain and sprocket pitches would normally dictate, the root portions 90 on the saw chain are not engaged by the sprocket teeth immediately upon entering the space between the teeth because of the radial positioning of the saw chain by the sprocket disc 102, just mentioned. Thus, in FIG. 5, it will be observed that a substantial clearance exists between the sprocket teeth 104 at the top of the sprocket 32 and the root portions 90 entering the space between these teeth. The space between the trailing edges of the root portions and the leading edges of the sprocket teeth decrease progressively around the sprocket, in the direction of its rotation, until one set of sprocket teeth engage the adjacent root portions just before these teeth reach their lowermost position and just before the saw chain leaves the sprocket. Accordingly, it is evident that driving contact between the sprocket teeth 104 and the root portions 90 of the saw chain does not occur until the root portions have reached their final radial position with respect to the sprocket. At the bottom of the sprocket, the root portions leave the sprocket abruptly. No sliding friction occurs between the sprocket teeth and root portions, therefore, so that friction losses and wear between these parts are reduced to an absolute minimum.

Owing to the fact that the saw chain is maintained at a greater radial distance from the axis of rotation of the sprocket 32 than the pitch of the chain and the pitch of the sprocket would normally dictate, so that driving contact between the sprocket teeth 104 and the root portions 90 of the saw chain does not occur until just before the point at which the saw chain leaves the sprocket, the angular velocity at which the saw chain 30 travels around the sprocket is slightly less than the agularly velocity of the sprocket itself. In other words, relative angular movement occurs between the saw chain and the sprocket. It is for this reason that the sprocket disc 102 is rotatably supported with respect to the sprocket proper. Thus, as the saw chain travels about the sprocket, it seats on the sprocket disc 102 which, therefore, travels at the same angular velocity as the saw chain and at a slightly lesser angular velocity than the sprocket. The sprocket disc 102, therefore, provides a rotatable support for the saw chain in its travel about the sprocket 32 and accommodates the angular velocity differential between the saw chain and the sprocket without sliding friction between the chain and disc.

In view of the fact that the sprocket disc 102 rotates with respect to the sprocket 32 proper, that is, with respect to the two sprocket elements 96, it is desirable to provide lubrication between the sprocket disc and sprocket elements. Referring to FIG. 6, this lubrication is accomplished as follows: Within the engine shaft 46 is a lubricant passage 108. One end of this passage opens radially to the outside of the shaft in line with the sprocket elements 96 and sprocket disc 102. Flow passages 110 are provided in the sprocket elements to permit lubricant to flow from the passage 108 to the spaces between the sprocket disc and the sprocket elements. The other end of the lubricant passage 108 communicates with an external, circumferential groove 112 in the shaft 46. This groove is located within a journal sleeve 114 on the engine housing 116. In this sleeve is threaded a nipple 118 connected to a lubricant line 120 leading to a suitable lubricant source (not shown). Leakage of lubricant between the shaft 46 and the journal sleeve 116 is prevented by a rotary seal 124.

From this description, it is evident that lubricant flows through the shaft passage 108 to the spaces between the sprocket disc 102 and the sprocket elements 96, thereby to assure substantially frictionless rotation of the sprocket disc with respect to the sprocket elements. Incidentally, the lubricant is thrown radially outward to the saw chain 30 by centrifugal force when the sprocket is driven in rotation. This lubricant is carried by the saw chain to the saw bar so as to minimize the friction between the saw chain and the saw bar and to lubricate the joints.

Referring now again to FIG. 5, each of the cutter links 76, 82 and 86 of the saw chain 30 has a leading depth gauge 126. As is well understood in the art, the purpose of these depth gauges is to limit the depth of cut of the cutters 78, 84, 88 on the respective links. In order to accomplish this function, the height of the depth gauges must be different by a predetermined amount from the height of the respective cutter teeth. In the upper part of FIG. 5, for example, the depth gauge 126 on each raker link 76 will be observed to be lower than its respective cutter 78 by the amount A. An inspection of FIG. 5 will also make it evident that the height of the raker teeth 78 is slightly less than the height of the side cutters 84, 88. In the upper part of FIG. 5, for example, each raker tooth 78 is shown as being lower than the side cutters 84 and 88 by an amount equal to the dimension D. Thus, when the saw chain 30 is cutting wood, the side cutters 84 and 88 cut grooves along opposite sides of the saw kerf which are deeper than the cut made by the raker teeth 78. These raker teeth, then, chip out the upstanding rib between the two grooves made by the side cutters. This type of sawing action is desirable since it minimizes the sawing effort and thereby the power requirement of the chain saw engine.

In the present improved chain saw and saw chain sharpener combination, the depth gauges, raker teeth, and side cutters are automatically sharpened to the correct height differential by the sharpener 58. This is accomplished as follows: In FIG. 5, the pitch of the side cutter links 82 and 86 will be observed to be equal and to be designated by the dimension $P_s$. The pitch of the center raker links 76 is denoted by the dimension $P_c$. It will be seen that the pitch $P_s$ of the side cutter links is somewhat greater than the pitch $P_c$ of the raker links. Moreover, the distance $D_1$, measured in the endwise direction of each cutter link, between a plane normal to and bisecting a line joining the center of the pivots of the respective link and the trailing edge of the respective depth gauge will be seen to be greater than the distance $D_2$ between this plane and the leading edge of the respective cutter or saw tooth. The line, just mentioned, joining the pivot centers of each link is hereinafter referred to as the pitch line. The path of motion followed by the pivot centers is hereinafter referred to as the line of action.

Now, it is evident that the pitch lines of those links which are traveling along the upper and lower edges of the saw bar 28 are substantially coincident with the line of action. As each link enters its circularly curved path of motion about the sprocket 32 and past the sharpener 58, however, the pitch line of the link deviates from the line of action by an amount proportional to the pitch of the link. In other words, the normal or perpendicular distance $D_3$ between the center of the pitch line of each side cutter link 82 and 86 and the circularly curved line of action around the sprocket is greater than the normal distance $D_4$ between the center of the pitch line of each center raker link 76 and the curved line of action because of the greater pitch of each side cutter link.

Now, then, as the cutter links travel along their curved path of motion past the sharpener, the latter hones the top faces of the cutters 78, 84 and 88 and the depth gauges 126 to a circularly curved contour centered on the axis of the sprocket 32, as shown in FIG. 5. The top faces of the several cutters and depth gauges on the links which, at any given instant, are traveling around the sprocket, then, are located on and move along a common circularly curved direction line centered on the sprocket axis.

As the links leave the sprocket 32 and enter their generally linear path of motion along the saw bar, the pitch lines of the links return to coincidence with the line of action, with the result that the distance from the line of action to the top faces of the cutter and depth gauge on each cutter link increases by an amount equal to the normal distance $D_3$ or $D_4$ between the centers of the pitch line of the respective link and the curved line of action about the sprocket 32 while the respective link is traveling around the sprocket. In view of what was said earlier concerning the differences in this normal distance between the side cutter links 82, 86 and the center raker links 76, it is obvious that the distance between the line of action and the top faces of the cutters on the side cutter links increases more than the distance between the line of action and the top faces of the cutters on the center raker links. As a consequence, the top faces, and, therefore, the leading cutting edges of the cutters 84, 88 on the side cutter links 82, 86 undergoing generally linear motion along the saw bar 28, are higher than the top faces, and leading cutting edges, of the center raker links 76 undergoing linear motion along the saw bar. In other words, the side cutters are higher than the center rakers, whereby the sawing action described earlier is attained. Both the center cutters and side cutters have their cutting edges spaced to the rear of the center of the pitch line joining the pivot centers of the respective link by the amount $D_2$ to produce the optimum clearance angle on the cutters.

It is further evident from what has been said thus far, as well as from an inspection of FIG. 5, that the top faces of the depth gauge and cutter on each cutter link are located on a common circular curve which reaches its maximum distance from the pitch line of the respective link at the intersection of this curve with the aforesaid plane normal to and bisecting the pitch line of the respective link. In view of this and in view of what was said earlier concerning the closer location of the cutter on each cutter link to this plane than the depth gauge on the respective link, it is obvious that the height of each cutter will be greater than the height of the corresponding depth gauge by an amount (dimension A in FIG. 5) which is related to the difference in the distances between said plane of each link and the corresponding cutter and depth gauge. In FIG. 4, the depth gauges 126 on the side cutter links will be observed to be offset inwardly. The pressure of these inwardly offset depth gauges against the material being cut counteracts the normal tendency for the links to tip sideways in the direction of their cutters and thereby cause excessive wear of the saw bar.

From the preceding discussion, it is evident that saw chain 30 is so constructed that the side cutters and center rakers are automatically honed or sharpened to predetermined different heights as are the depth gauge and cutter of each link. The difference in height of the cutters can be controlled by controlling the difference in pitch of the side cutter and raker links. Similarly, the difference in height of the depth gauge and cutter on each link can be controlled by controlling the relative distances of the depth gauge and cutter from the aforesaid plane of the respective link.

In operation of the chain saw of FIGS. 1–6, the adjustable stop 62 for the saw chain sharpener 34 is first adjusted to the desired setting and the hone or sharpening element 58 is then brought to sharpening position by gripping the knob 60 of the sharpener and advancing it toward the saw chain. The knob is simultaneously turned slowly to rotate the hone or sharpener 58. As the saw chain 30 moves past the sharpener, the outer faces or tips of the cutters on the chain are honed in the manner just described. This honing of the tips of the cutters sharpens their cutting edges, which are defined by the intersection of the outer faces and the leading faces of the cutters.

Owing to the fact that the sharpener 58 is slowly rotated on its axis while the saw chain cutters are being sharpened, a generally spherical recess or depression 128 is gradually produced in the end face of the sharpener. The curvature of this recess, in the plane of movement of the saw chain, is centered on the axis of the sprocket 32. As a result, each cutter of the saw chain remains in contact with the sharpener throughout a substantial distance of travel of the respective cutter past the sharpener. This, of course, appreciably reduces the time required to sharpen the saw chain. The extent of the honing surface in the direction of travel of the saw chain is made sufficient to assure simultaneous contact of the depth gauge and cutting edge of each tooth with the surface. This prevents the cutting edge from being rocked or tilted out of its normal arcuate path past the sharpener. Also both the right and left-hand side cutters receive equal radial pressure, whereby very uniformly sharpened cutting edges are obtained. Because of the fact that the sharpener is not grooved, as are conventional saw chain grinders which are disposed for peripheral contact with the saw chain cutters, the cutters on the present saw chain are not rounded as they are in the case of such a conventional grinding wheel. Because of the fact that the sharpener 58 is a honing stone, rather than a conventional grinding wheel, only light pressure of the hone against the tips of the saw chain cutters and only slow rotation of the hone are required to effect an efficient sharpening action. Accordingly, there is no appreciable tendency for the sharpener to interfere with the smooth, uniform motion of the saw chain cutters past the sharpener, as is necessary to achieve proper sharpening of the cutters.

In FIG. 5, each of the center links 74 and 76 of the saw chain 30 will be observed to have leading and trailing extensions 130 and 132. The purpose of these extensions is as follows: As each link of the chain leaves its linear path of motion along the saw bar 28 and enters its circular path of motion around the sprocket 32, the link is subjected to an acceleration radially in toward the axis of the sprocket. This acceleration is extremely high and would normally cause the center links to move into impact with the edge of the sprocket disc 102 as each link underwent the transition from its linear path of motion to its circular path of motion. These impacts of the links against the disc would tend to dent the disc, create undesirable noise, and cause possible damage to the saw chain.

According to the present invention, the link extensions 130 and 132 are provided to avoid these impacts of the center links against the sprocket disc. Thus, the link extensions are proportioned so that the leading extension 130 on each center link engages the edge of the sprocket disc 102 before the respective link is subjected to its inward acceleration. Thus, the link is already in contact with the disc when this acceleration is imposed on the link so that impact of the link with the disc is avoided. The trailing extensions 132 on the center links are provided to effect a similar action as the center links leave the sprocket.

The saw chain 200 illustrated in FIGS. 8 and 9 is identical to the saw chain 30 in FIGS. 1–6, except that in the saw chain 200, the depth gauge 202 for each side cutter 204 (only one shown) is located on the link at the opposite side of the chain from the respective side cutter. It is obvious, however, that this modified chain of FIGS. 8 and 9 can be used on the chain saw of FIGS. 1–6 and when so used, can be sharpened in precisely the same way as that described in connection with the saw chain 30. This location of the depth gauge has the same effect as the offset depth gauge in FIGS. 1–7.

Reference is now made to FIGS. 10–13 which illustrate a chain saw, embodying the features of the present invention, of the type wherein the root portions 300 of the saw chain 302 are formed on the center links 304 of the chain and travel through slots 306 in the upper and lower edges of the saw bar 308 and in the curved, remote extremity (not shown) of the bar.

The chain drive sprocket 310 in the chain saw of FIGS. 10–13 comprises a single sprocket 312 proper having teeth 314. As may be best observed in FIG. 11, sprocket 312 is positioned on and keyed to the cylindrical hub 315 of a centrifugal clutch 316. Hub 315, in turn, is rotatably positioned on the shaft 318 of the engine (not shown) which drives the sprocket 312 through the clutch 316. This clutch includes a cylindrical housing 320 integral with the hub 315 and enclosing a centrifugally actuated clutch mechanism (not shown) which is operative to drivably couple the housing 320, and thereby the sprocket 312, to the engine shaft 318 in response to the latter attaining a predetermined rotary speed. If the rotary speed of the shaft drops below this predetermined speed, the clutch 316 disengages the sprocket 312 from the shaft.

Rotatable on the hub 315 of the clutch 316, at either side of the sprocket 312, is a disc 322. The discs 322 are retained in axial position on the hub by a hub shoulder 324 and a washer 326 backed up by the illustrated snap ring. Discs 322 are thereby freely rotatable with respect to the sprocket 312. These discs perform a saw chain supporting function similar to that performed by the sprocket disc 102 in the chain saw of FIGS. 1–6, as will now be described.

As shown best in FIG. 13, saw chain 302 comprises, in addition to the center links 304, side links 328 without cutters and side links 330 and 332 with cutters 334 and 336, respectively. The links 330 and 332 are alternately arranged, at opposite sides of the saw chain, so that the side cutters 334 and 336 are arranged in the sequence right cutter, left cutter, right cutter, left cutter, and so on. The tips of the cutters 334 are inclined with respect to the direction of movement of the saw chain 302 and the cutting edge on each cutter extends, at one end, beyond the adjacent side of the saw chain and at the other end a slight distance beyond a plane passing through the longitudinal center line of the chain. In this way, the inner ends of the cutting edges on the cutters overlap to clean out the total kerf width.

In that portion of the saw chain 302 which, at any instant, is located on the sprocket drive 310, the outer links 328, 330 and 332 of the saw chain seat on the outer edges of the sprocket discs 322, as shown. The root portions 300 of the center links 302 of the chain extend between the discs and engage between the sprocket teeth 314. When the sprocket 312 is driven in rotation from the engine shaft 318, therefore, the sprocket drives the saw chain in its sawing motion around the saw bar 308. In a manner similar to the saw chain of the previous form of the invention, the edges of the side links 328, 330 and 332 which seat against the outer edges of the sprocket discs 322 are recessed, as shown at 338, in order to afford each side link with two point contact with its respective sprocket disc 322.

The diameter of the sprocket discs 322 is such as to hold the saw chain 302 at a greater radial distance from the axis of the sprocket 312 than would normally be dictated by the pitch of the saw chain and the pitch of the sprocket. As a result, the root portions 300 of the saw chain are not immediately engaged by teeth 314 on the sprocket as the root portions enter the spaces between the sprocket teeth, at the top of the sprocket in FIG. 10, assuming the sprocket is driven in the counterclockwise direction of rotation. Accordingly, as in the previous form of the invention, sliding friction and wear between the entering root portions and the sprocket teeth are minimized. As the saw chain follows its curved path of motion around the sprocket, the clearance between the trailing edge of each root portion and the leading edge of the adjacent following sprocket tooth progressively decreases until, just prior to each root portion reaching the position at the lower side of the sprocket at which the respective root portion leaves the sprocket, each root portion is drivably engaged by the following sprocket tooth. The root portions leave the sprocket abruptly as in the previous form of the invention.

Accordingly, it is evident that the sprocket 312 rotates at a slightly greater angular velocity than the angular velocity of the saw chain around the sprocket so that differential angular movement occurs between the saw chain and the sprocket. Since the side links of the saw chain seat against the outer edges of the sprocket discs 322, the latter move with the saw chain and thereby rotate slightly slower than the sprocket. The sprocket discs 322, therefore, accommodate the differential angular velocities of the sprocket and saw chain without rubbing friction or wear between the discs and chain.

Because of this relative rotation of the sprocket 312 and the sprocket discs 322, it is desirable to supply lubrication to the spaces between the sprocket and the sprocket discs. In the chain saw under consideration, this lubrication is provided as follows: Extending through the engine shaft 318 is a lubricant passage 340. Leading radially from this lubricant passage to a pair of circumferential grooves 342 in the engine shaft, in radial alignment with the sprocket discs 322, respectively, are a pair of lubricant passages 344. Communicating with the shaft grooves 342 and extending through the centrifugal clutch hub 315 are a second pair of lubricant passages 346. These latter passages open through the outside of the hub opposite the sprocket discs 322. Thus, when lubricant is supplied to the shaft passage 340, it flows through the passages 344 to the shaft grooves 342 and thence through the passages 346 in the centrifugal clutch hub 315 to the undersides of the sprocket discs 322. The lubricant then flows between each sprocket disc 322 and the adjacent side of the sprocket 312.

Shaft passage 340 opens, at one end, to a plunger bore 348 in the engine housing 350. Slidably fitted in this bore is a piston 352. Bore or cylinder 348 opens at its inner end to the bore 354 in the engine housing 350 which receives the shaft 318. A spring 356, acting between a screw 358 threaded in the outer end of the cylinder 348 and the plunger 352, resiliently urges the latter toward the engine shaft 318. The portion of the shaft 318, opposite the cylinder 348, is relieved in such a way as to provide the shaft 318 with an eccentric or cam surface 360 against which the inner end of the plunger 352 seats. Leading from the cylinder 348 to a source (not shown) of lubricant is a lubricant supply passage 362. This source of lubricant may comprise, for example, the crankcase (not shown) of the chain saw engine.

The ends of the lubricant passages 340 and 362 which open into the cylinder 348 are offset axially of the cylinder. When the engine shaft 318 is rotated, the plunger 352 is reciprocated back and forth in the cylinder 348 by the shaft eccentric 360. The parts are proportioned so that during the right-hand stroke of the piston 352, the latter uncovers the inlet passage 362 so that lubricant flows from the passage 362 into the cylinder 348. During the subsequent left-hand stroke of the piston 352, the latter re-covers the lubricant inlet passage 362 and forces the lubricant, which is then trapped in the left-hand end of the cylinder 348, into the shaft passage 340. Accordingly, during continuous rotation of the engine shaft 318, lubricant is intermittently pumped through the shaft passage 340 to the sprocket discs 322 to lubricate the latter. Coincidentally, the lubricant is also thrown radially outward to the saw chain 302, during rotation of the sprocket drive 310 with the engine shaft 318. The lubricant thus acquired by the saw chain lubricates its pivot joints and is carried by the saw chain to the saw bar 308 to reduce friction and wear between the moving saw chain and the saw bar.

Indicated at 364 in FIG. 10 is a saw chain sharpener identical to that described earlier. Thus, the sharpener 364 includes a shaft 366 which is rotatably supported on the chain saw frame (not shown) in exactly the same manner as the previous sharpener. Bonded to a disc 368 on the sharpener shaft 366 is a cylindrical honing stone or sharpening element 370. The end face of this sharpener or hone confronts the tips of the chain saw teeth 334 and 336 as the latter travel past the sharpener.

During operation of the chain saw under consideration, the sharpener 370 is advanced toward the saw chain in the manner described earlier until the tips or outer faces of the cutters 334 and 336 engage the end face of the hone 370 as the cutters travel past the hone. The outer faces of the cutters are thereby sharpened in exactly the same manner as the cutters on the saw chain in the previous form of the invention. Each side cutter link 330 and 332 also includes a depth gauge 372 which is honed as it travels past the sharpener. The cutter and depth gauge on each side link 330 and 332 of the saw chain will be observed to be so disposed, in the endwise direction of the respective chain link, that the depth gauges are honed to a lower height than the cutters, in precisely the same way as described earlier in connection with the chain saw of FIGS. 1–6. Thus, the depth gauges are automatically honed to the correct height for performing their depth gauging action for the respective following cutters. Since the end of each cutter 334, 336 nearest the center line of the saw chain trails the outer end of the respective cutter, the cutting edge of the cutter will slope when viewed as in FIG. 12. While the saw chain cutters and depth gauges are being honed or sharpened, the sharpener 364 is simultaneously slowly turned on its axis so that a spherical depression or recess 374 is gradually worn in the end face of the hone or sharpener 370. The chain saw of FIGS. 10–13, then, possesses all the advantages described earlier in connection with the chain saw of FIGS. 1–6.

Reference is now made to FIGS. 14 and 15 illustrating a further modified form of the present improved chain saw and saw chain sharpener combination. In FIG. 14, the modified chain saw 400 will be seen to comprise a saw bar 402 of the same general type as that embodied in the chain saw of FIGS. 1–6, that is to say, a saw bar which is designed to be straddled by the side links 404 of the saw chain 406. This saw chain also has center links 408 and is shown to be of the same general type as the saw chain 30 in FIGS. 1–6.

Saw bar 402 has a channel 410 in which is slidably fitted a tongue 412 on a saw chain supporting plate 414. Extending through a short slot 416 in this plate is a bolt 418 fastened to the saw frame 420. A nut, not shown, threaded on this bolt clamps the supporting plate to the saw frame. The plate can, therefore, be shifted in the endwise direction of the saw bar, for reasons to be explained later, by loosening this nut.

Extending through a long slot 422 in the saw bar 402 and a shorter slot 424 in the tongue is a second bolt 425 also fastened to the saw frame. A nut, not shown, threaded on this bolt clamps the saw bar to the frame. The saw bar can thus be adjusted in its endwise direction with respect to the supporting plate 414 and the saw frame 420 by loosening this latter nut.

As shown best in FIG. 15, the shaft 426 of the engine (not shown) for the chain saw extends through an enlarged hole 428 in the saw chain supporting plate 414. Slidably keyed on this shaft, within the hole 428 in the supporting plate 414, is a hub 429 to which are keyed two sprockets 430 which together make up a sprocket drive assembly 431 for driving the saw chain 406 around the saw bar 402. Thus, as shown in FIG. 14, the teeth 432 of the sprockets 430 are adapted to mesh with and drivably engage the root portions 434 of the saw chain 406.

The center links 408 of the saw chain 406 ride along the curved edge 436 of the saw chain supporting plate 414. This edge of the supporting plate is curved in such a way that the saw chain is initially retained at a greater radial distance from the axis of the sprockets 430 than the pitches of the chain and sprockets would normally dictate. The distance between the edge 436 and the axis of the sprocket assembly 431 gradually decreases until within a driving zone, designated by the letter Z in FIG. 14, the saw chain is properly radially located with respect to the axis of the sprockets 430 for engagement of the root portions 434 of the saw chain links within the zone Z with the sprocket teeth 432. After leaving this zone, the distance between the sprocket axis and the supporting plate edge 436 again gradually increases. Thus, the edge 436 of the saw chain supporting plate 414 is curved in such a way that the radial spacing between the line of action of the saw chain 406 and the axis of the sprockets 430 gradually decreases to a minimum, within the zone Z, and then increases so that driving of the saw chain by the sprockets 430 occurs only within the zone Z. This arrangement is such that the root portions 434 of the saw chain gradually move radially in toward the axis of the sprockets until the final radial position of the root portions with respect to the sprockets is reached in the zone Z. Only after the root portions have thus reached their final radial position with respect to the sprockets are the root portions engaged by the sprocket teeth 432 to drive the chain. As a result, in the form of the chain saw under consideration, sliding friction and wear between the root portions and the sprocket teeth, and, therefore, friction losses, are minimized in much the same way as in the earlier forms of the invention. The curvature of the supporting plate edge 436 away from the sprocket axis following the zone Z permits the root portions 434 of the saw chain to leave the sprockets 430 without sliding friction or wear.

As explained earlier, during continued operation of a chain saw, the saw chain gradually elongates due to wear at the chain pivots. In the form of the chain saw under consideration, this elongation of the saw chain can be compensated for by loosening the bolt 425 and adjusting the saw bar 402 to the right in FIG. 14 until the saw chain is again appropriately taut. After the chain has become sufficiently worn to effect the sprocket tooth action, both bolts 418 and 425 are loosened and the saw chain supporting plate 414 is moved a small distance to the left. The enlarged hole 428 in the saw chain supporting plate 414, of course, accommodates this adjustment of the plate with respect to the engine shaft 426 and the sprockets 430 thereon. It will be observed that during this adjustment of the supporting plate 414, the radial spacing between the plate edge 436 and the axis of the sprockets 430 is increased so that the root portions 434 of the saw chain are located farther out toward the tips of the sprocket teeth than they were originally. This movement of the root portions out toward the tips of the sprocket teeth has the effect of increasing the pitch of the sprockets and accommodates the increase in pitch of the saw chain which occurs during elongation of the chain. Accordingly, proper sprocket tooth action can be restored after excessive stretching of the saw chain by adjusting the plate 414 as described.

The saw chain sharpener 438 is mounted in the position illustrated to sharpen the saw chain cutters as the latter travel around the supporting plate edge 436 and past the sharpener. The manner in which this sharpening operation is carried out and the manner in which the saw chain cutters are thereby sharpened are identical with the earlier forms of the invention, so that this sharpening action will not be explained further at this point.

Within the engine shaft 426 is a lubricant passage 439. This passage may be supplied with lubricant in either of the ways described earlier, or in some other way. This lubricant eventually reaches and lubricates the plate edge 436 and the saw chain.

The chain saw construction of FIG. 14 is highly desirable, not only because sliding friction and wear between the sprocket teeth and chain root portions are minimized, as in the previous forms of the invention, but, further, because of the fact that the saw bar 402, sprocket assembly 431, saw chain supporting plate 418, and the saw chain 406 thereon form a cutting unit which may be removed in one piece from the chain saw frame by simply removing the bolts 418 and 425. While the saw illustrated in FIGS. 14 and 15 uses a straddle chain, obviously the features of the latter saw can be embodied in one using a center guide chain.

Reference is now made to FIGS. 16, 17, 18 and 19 illustrating two saw chain cutter configurations which are ideally suited for use on any one of the disclosed chain saws. The center cutter links 500 illustrated in FIGS. 16 and 17 comprise a link body 502 having an upstanding extension 504 which is twisted about an axis transverse to the direction of movement of the chain to form a twisted tooth having a cutting edge 506 inclined to the direction of movement of the saw chain. This twisted tooth link can be quickly, easily, and economically fabricated in a single stamping and forming operation in which the link is simultaneously stamped out and twisted to form the cutter blank. This tooth configuration requires right- and left-hand side cutters 508 and 510, as shown. In the illustrated saw chain, these side cutters have depth gauges 512. The twisted center cutters 500, on the other hand, have no depth gauges and are, therefore, pivotally connected directly to the preceding side cutters so that the latter serve as depth gauges for the center cutters. The illustrated chain also has a mixed pitch to effect grinding of the center and side cutters to different heights when the chain is sharpened on the present chain saw-sharpener combination.

The saw chain 600 illustrated in FIGS. 18 and 19 comprises alternate right- and left-hand cutters 602, 604 which are mirror images of one another. Thus, each cutter comprises an extension 606 on the respective chain link having a leading portion 608 disposed approximately in a plane parallel to the direction of movement of the chain and a trailing tab portion 610 which is bent inwardly toward the center line of the chain. The leading surface 612 of this tab portion is inclined to the direction of travel of the chain so as to provide the proper clearance angle for the cutting edge 614 along the top edge of the tab portion. The leading edge and top edge of the leading cutter portion 608 are beveled to form chisel edges 616 and 618. If desired, the top bevel may be omitted, leaving only the leading chisel edge 616 and the top cutting edge 614 on the cutter.

Owing to the fact that the leading end of the chisel edge 618 on each cutter 602, 604 is nearer the longitudinal center of the respective link than the trailing end of the chisel edge and the cutting edge 614, the leading end of the chisel edge 618 will be higher than the trailing end of the chisel edge and the cutting edge 614 when the cutters are sharpened on the present chain saw. As a result, the cutting edge 614 of each cutter will produce a true "chisel" type cut as currently used and the chisel edges 618 of the cutters will cut "scratcher" grooves.

Clearly, therefore, the several forms of the invention herein described and illustrated are fully capable of attaining the several objects and advantages preliminarily set forth. While certain preferred embodiments of the invention have been disclosed for illustrative purposes, numerous modifications in the design, arrangement of parts, and instrumentalities of the invention are possible within the spirit and scope of the following claims.

What is claimed is:

1. In a chain saw having a frame, a saw bar attached to said frame, a saw chain trained about said bar including a multiplicity of cutters spaced along the chain, and rotary means for driving said saw chain around said saw bar, the improvements comprising a rotary sharpener mounted on said frame for turning on an axis approximately parallel to the plane of the saw bar and approximately intersecting the axis of rotation of said driving means, said sharpener including a hone having an end sharpening face disposed transversely to said axis of said sharpening means for contact with said cutters to sharpen the latter as they travel past said sharpener.

2. In a chain saw having a frame, a saw bar attached to said frame, a saw chain trained about said bar including a multiplicity of cutters spaced along the chain, and rotary means for driving said saw chain around said saw bar, the improvements comprising a rotary sharpener mounted on said frame for turning on an axis approximately parallel to the plane of the saw bar and approximately intersecting the axis of rotation of said driving means, said sharpener including a hone having an end sharpening face disposed transversely to said axis of said sharpening means for contact with said cutters to sharpen the latter as they travel past said sharpener, and a handle on said sharpener accessible to the chain saw operator for slowly turning said hone by hand as said cutters are being sharpened.

3. In a chain saw having a frame, a saw bar attached to said frame, a saw chain trained about said bar including a multiplicity of cutters spaced along the chain, and rotary means for driving said saw chain around said saw bar, the improvements comprising a rotary sharpener mounted on said frame for turning on an axis approximately parallel to the plane of the saw and approximately intersecting the axis of rotation of said driving means and for movement along its axis toward and away from the path of movement of said cutters, said sharpener including a hone having an end sharpening face disposed transversely to said axis of said sharpening means for contact with said cutters to sharpen the latter as they travel past said sharpener, and a handle on said sharpener accessible to the chain saw operator for manually extending said hone into and retracting said hone away from the path of movement of said cutters past the sharpener and slowly turning said hone as said cutters are being sharpened.

4. In a chain saw having a frame, a saw bar attached to said frame, a saw chain trained about said bar including a multiplicity of cutters spaced along the chain, and rotary means for driving said saw chain around said saw bar, the improvements comprising a rotary sharpener mounted on said frame for turning on an axis approximately parallel to the plane of the saw and approximately intersecting the axis of rotation of said driving means and for movement along its axis toward and away from the path of movement of said cutters, said sharpener including a hone having an end sharpening face disposed transversely to said axis of said sharpening means for contact with said cutters to sharpen the latter as they travel past said sharpener, a handle on said sharpener accessible to the chain saw operator for manually extending said hone into and retracting said hone away from the path of movement of said cutters past the sharpener and slowly turning said hone as said cutters are being sharpened, and an adjustable stop on said frame for limiting extension of said hone toward said path.

5. A chain saw comprising a frame, a saw bar mounted on said frame, a saw chain trained about said saw bar, curved saw chain supporting plate means mounted on said frame at one end of said saw bar around which said saw chain travels and including curved saw chain supporting edge means which seat and support links of said saw chain as the latter travels around said plate means, drive sprocket means rotatably mounted on said frame at said one end of said saw bar for turning with respect to said plate means and having teeth drivably engaging said saw chain over a given distance along said edge means for driving said saw chain around said saw bar, means for driving said sprocket means, and a saw chain sharpener mounted on said frame opposite said supporting edge means for turning on an axis approximately parallel to the plane of said saw bar and approximately intersecting the rotation axis of said sprocket means including a concave end sharpening face approximately concentric with said rotation axis and disposed to engage and sharpen the saw chain cutters on that portion of the saw chain traveling around and supported by said supporting plate means.

6. A chain saw comprising a frame, a saw bar mounted on said frame, a saw chain trained about said saw bar, curved saw chain supporting plate means mounted on said frame at one end of said saw bar around which said saw chain travels and including curved saw chain supporting edge means which seat and support links of said saw chain as the latter travels around said plate means, drive sprocket means rotatably mounted on said frame at said one end of said saw bar for turning with respect to said plate means and having teeth drivably engaging said saw chain over a given distance along said edge means for driving said saw chain around said saw bar, means for driving said sprocket means, said saw chain including cutters spaced therealong, and a saw chain sharpener mounted on said frame opposite said edge means and disposed for sharpening engagement with the cutters on the portion of the saw chain while traveling around said supporting plate means.

7. A chain saw comprising a frame, a saw bar fixed to said frame, a rotary power shaft on said frame at one end of and extending normal to the plane of said saw bar, a drive sprocket on said shaft, a saw chain trained about said saw bar and sprocket including pivotally connected links and cutters on at least some of said links having transversely extending cutting edges defined by the intersection of the top faces and leading edges of the respective links, a saw chain sharpener mounted on said frame in a position for sharpening said top faces of said cutters as the respective cutter links travel around said sprocket and past said sharpener, said top faces of said cutters following a common curved path of motion past said sharpener, and the pitch of some of said cutter links being different from the pitch of other cutter links, whereby the cutters on links of different pitch are sharpened to different heights with respect to a line of action passing through the pivot axes of the links.

8. A chain saw comprising a frame, a saw bar fixed to said frame, a rotary power shaft on said frame at one end of and extending normal to the plane of said saw bar, saw chain supporting plate means on said frame about said shaft and approximately coplanar with said saw bar, a saw chain trained about said saw bar and supporting plate means including a series of pivotally connected links and cutters on some of said links having transversely extending cutting edges defined by the intersection of the top faces and leading edges of the respective cutters, a drive sprocket on said shaft having teeth drivably engaging said saw chain for driving the latter around said saw bar, said supporting plate means having curved saw chain supporting edge means seating and supporting links of said chain during movement of the latter around said sprocket, a saw chain sharpener on said frame opposite said edge means for sharpening said top faces of said cutters while the latter travel around said supporting plate means past the sharpener, said top faces of the cutters following a common curved path of motion past said sharpener, and the pitch of some cutter links being different from the pitch of other cutter links, whereby the cutters on links of different pitch are sharpened to different heights with respect to a line of action passing through the pivot axes of the links.

9. A chain saw comprising a frame, a saw bar fixed to said frame, a rotary power shaft on said frame at one end of and extending normal to the plane of said saw bar, a circular saw chain supporting plate rotable on said shaft and disposed in the plane of said saw bar, a pair of sprockets keyed to said shaft at opposite sides of said plate, a saw chain trained about said saw bar and supporting plate and including a series of alternate, pivotally connected center and side links, said side links having root portions straddling said saw bar and supporting plate, said supporting plate having a peripheral edge seating and supporting said center links during movement of the chain around said sprockets, said sprockets having teeth drivably engaging said root portions for driving the chain around said saw bar, some of said links having cutters with transversely extending cutting edges defined by the intersection of the top faces and leading edges of the respective cutters, a saw chain sharpener on said frame opposite said peripheral edge for sharpening said top faces of cutters as the latter travel around said supporting plate and past the sharpener, said top faces of the cutters following a common circularly curved path of motion past said sharpener, and the pitch of said center links being different from the pitch of said side links, whereby the cutters on said center links are sharpened to a different height than the cutters on said side links with respect to a line of action passing through the pivot axes of the links.

10. A chain saw comprising a frame, a saw bar fixed to said frame, a rotary power shaft on said frame at one end of and extending normal to the plane of said saw bar, said saw bar having a groove in its edge, a pair of circular saw chain supporting plates rotatable on said shaft and defining therebetween a space which is coplanar with said saw bar groove, a sprocket keyed to said shaft between said plates, a saw chain trained about said saw bar and plates and including a series of alternate, pivotally connected center and side links, said center links having root portions engaging in said saw bar groove and in said space between said supporting plates, said sprocket including teeth drivably engaging said root portions for driving said saw chain about said saw bar, said supporting plates having peripheral edges seating and supporting said side links during movement of said chain around said sprocket, some of said links having cutters with transversely extending cutting edges defined by the intersection of the top faces and leading edges of the respective cutters, a saw chain sharpener on said frame opposite said supporting plate edges for sharpening said top faces of the cutters during movement of the latter around said plates, said top faces following a common circularly curved path of motion around said plates and past said sharpener, and the pitch of said center links being different from the pitch of said side links.

11. In a chain saw having a frame, a guide bar attached to said frame, a saw chain trained about said bar and comprising a multiplicity of links pivotally connected together and including links with cutters having transversely extending cutting edges defined by the intersection of an inclined forward face and a transverse top edge surface of respective cutters and depth gauges associated with and in advance of respective cutters, means at one end of said bar for guiding said chain links in a substantially arcuate path and sharpening means comprising a sharpening element having an abrasive surface which is concavely arcuate and is disposed substantially concentric with said arcuate path in position to engage said top edge surfaces of said cutters and the tops of said depth gauges, said abrasive surface being of sufficient extent in the direction of travel of said links to be in engagement at the same time with a cutter and the associated depth gauge and means mounting said sharpening element on said frame for angular movement about an axis of rotation and for linear movement along said axis.

12. In a chain saw having a frame, a guide bar attached to said frame, a saw chain trained about said guide bar and comprising a multiplicity of links pivotally connected together and including links with cutters having transversely extending cutting edges defined by the intersection of an inclined forward face and a transverse top edge surface of respective cutters and depth gauges associated with and in advance of respective cutters, a rotatable drive sprocket at one end of said guide bar and having teeth engaging said saw chain for driving the latter around said guide bar, and sharpening means comprising a sharpening element having an arcuately concave abrasive surface disposed substantially concentric with said sprocket in position to engage said top edge surfaces of said cutters and the tops of said depth gauges, said surface being of sufficient extent in the direction of travel of the chain to be in engagement at the same time with a cutter and the associated depth gauge and means mounting said sharpening element on said frame for angular movement about an axis of rotation and for linear movement along said axis.

13. A chain saw comprising a frame, a guide bar mounted on said frame, a saw chain trained about said guide bar, a curved saw chain supporting plate means mounted on said frame at one end of said guide bar around which said saw chain travels and including a convexly curved saw chain supporting edge means which support links of said saw chain as they travel around said plate means, drive sprocket means rotatably mounted on said frame at said one end of said guide bar for rotation with respect to said plate means and having teeth in driving engagement with said saw chain over a selected distance along said edge means to drive said saw chain around said guide bar, means for driving said sprocket means, said saw chain including cutter links spaced therealong and having cutters with transversely extending cutting edges defined by the intersection of an inclined forward face and a transverse top edge surface, and a saw chain sharpener mounted on said frame and having a concave abrasive surface positioned for engagement by said top edge surfaces of said cutter while the respective cutter links are supported by and travel along said curved edge means, said surface having successive portions along the path of travel of said links substantially equidistant from said curved edge means.

References Cited by the Examiner

UNITED STATES PATENTS

| | | | |
|---|---|---|---|
| 1,358,998 | 11/1920 | Stauder | 51—132 |
| 1,952,270 | 3/1934 | March et al. | 143—32 |
| 2,197,211 | 4/1940 | Forrest | 74—243 |
| 2,348,588 | 5/1944 | Arsneau | 143—32 |
| 2,651,336 | 9/1953 | Warren | 143—135 |
| 2,718,908 | 9/1955 | Kiekhaefer | 143—32 |
| 2,809,718 | 10/1957 | Kos | 184—27 |
| 2,821,097 | 1/1958 | Carlton | 76—37 |
| 2,857,942 | 10/1958 | Mall | 143—135 |
| 2,883,000 | 4/1959 | Mattson | 184—15 |
| 2,884,798 | 5/1959 | Wilson | 74—243 |
| 3,040,602 | 6/1962 | Carlton | 76—38 |
| 3,138,973 | 6/1964 | Muir | 76—37 |
| 3,147,644 | 9/1964 | Oehrli | 76—37 |
| 3,163,052 | 12/1964 | Oehrli et al. | 143—32 X |

FOREIGN PATENTS 811,667   8/1951   Germany.

DONALD R. SCHRAN, *Primary Examiner.*

WILLIAM W. DYER, JR., *Examiner.*